United States Patent [19]
Ratti et al.

[11] 3,969,610
[45] July 13, 1976

[54] LIQUID HEATING DEVICE

[75] Inventors: Helen Ratti; Charles Ratti, both of North Babylon, N.Y.

[22] Filed: Jan. 20, 1975

[21] Appl. No.: 542,434

[73] Assignee: Lawrence Peska Associates, Inc. New York, N.Y.; a part interest

[52] U.S. Cl. .............................. 219/441; 99/281; 219/435
[51] Int. Cl.² ........................................ F27D 11/02
[58] Field of Search .......... 219/354, 435, 436, 438, 219/441, 442, 494; 99/281, 340; 340/417

[56] References Cited
UNITED STATES PATENTS

| | | | |
|---|---|---|---|
| 900,295 | 10/1908 | Mortenson | 219/441 |
| 1,475,631 | 11/1923 | Herbst | 219/441 |
| 1,702,480 | 2/1929 | Newsom | 219/441 |
| 2,562,763 | 7/1951 | Best | 219/442 |
| 3,226,528 | 12/1965 | Martin | 219/441 |
| 3,247,360 | 4/1966 | Ponder | 219/436 |
| 3,385,955 | 5/1968 | Tucker | 219/441 |
| 3,530,276 | 9/1970 | Wells | 219/441 X |
| 3,781,521 | 12/1973 | Kircher | 219/442 |

*Primary Examiner*—Volodymyr Y. Mayewsky

[57] ABSTRACT

A liquid heating device is used to heat a liquid at a preselected time for a predetermined length of time such as in percolating coffee. The device broadly consists of a cylindrical container having a closed bottom base, a removal top lid cover, a pouring spout affixed to the sidewall of the container as well as a U-shaped handle affixed to the sidewall of the container. A transparent tube is provided as a means of indicating the liquid level within the container. A control panel on the bottom outside periphery of the sidewall of the container has an inlet electrical receptacle, an indicator light unit, a two way switch assembly, and a timer assembly.

2 Claims, 2 Drawing Figures

LIQUID HEATING DEVICE

SUMMARY OF THE INVENTION

Our present invention relates to a unique and novel liquid heating device used to heat a liquid at a preselected time for a predetermined length of time such as in percolating coffee.

A number of U.S. Pats. 2,562,763; 2,839,661; and 3,189,728 have employed coffee percolator devices, but these aforementioned patents are non-related to our present invention.

It is an object of our present invention to provide a liquid heating device, wherein a user can preselect a time at which he wishes the liquid heating device to be automatically activated.

A further object of our present invention is to provide a means whereby the activated heating device will automatically turn off due to a thermostatic device.

A still further object of our present invention is to provide a timer device that will automatically turn off the activated heating device after a predetermined length of time.

Another object of our present invention is to provide a liquid heating device of simple design.

Briefly, my present invention comprises a cylindrical container having a closed bottom base, a removal top lid cover, a pouring spout affixed to the sidewall of the container as well as a U-shaped handle affixed to the sidewall of the container. A transparent tube is provided as a means of indicating the liquid level within the container. A control panel on the bottom outside periphery of the sidewall of the container has an inlet electrical receptacle, an indicator light unit, a two way switch assembly, and a timer assembly.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
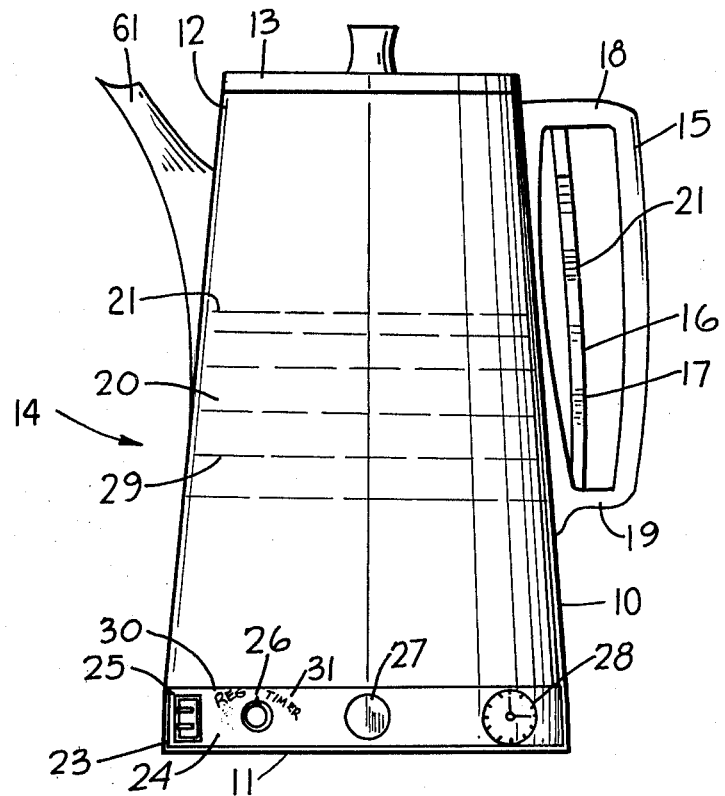
FIG. 1 illustrates a front elevated cross sectional view of the liquid heating device.
Figure 2:
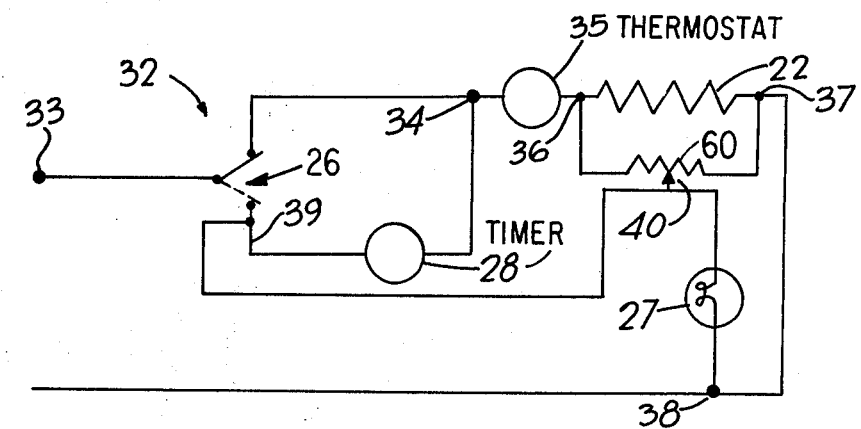
FIG. 2 illustrates a schematic view of the electrical circuit of the liquid heating device.

Turning now descriptively to the drawings, in which similar reference characters denote similar elements throughout the several views, FIG. 1 shows a liquid heating device conventionally used to percolate coffee, wherein the device 14 consist of a generally cylindrical shaped container 10 having a closed bottom base 11 and an upward extending cylindrical sidewall 12 of a slightly smaller top than bottom diameter, wherein a removable top lid cover 13 fits into the open top of the container 10. A U shaped handle member 15 is affixed onto the sidewall 12 of the container 10. A pouring spout 61 communicates with the sidewall 12 of the container 10. A transparent tube member 16 having a continuous bore 17 therethrough is joined between the legs 18, 19 of the handle member 15, wherein the ends (not shown) of the tube member 16 pass through the handle member 15 to communicate with the interior chamber 20 of the container 10. The level 21 of the liquid 29 within the container corresponds to the level 21 of liquid 29 within the bore 17 of tube member 16. The container 10 contains a conventional interior heating element 22 as shown in FIG. 2 for heating the liquid contained within chamber 20 of the container 10. On the bottom outside periphery 23 of the sidewall 12 of the container 10 is a control panel 24 containing an inlet receptacle 25, a two way switch assembly 26, a light unit 27, and a timer assembly 28. An electrical inlet line (not shown) communicates between a power source (not shown) and the inlet receptacle 25. The light unit 27 is illuminated, when the liquid 29 has been heated to a predetermined temperature. The two way switch assembly 26 permits the user to use the container on a regular 30 or a time 31 cycle. The timer assembly 28 permits the user to preset the timer such that the liquid will be heated at a predetermined time for a given length of time.

FIG. 2 shows an electrical circuit 32 of the liquid heating device 14 consisting of a first series circuit consisting of a power source 33, a two way switch assembly 26, a first electrical juncture 34, a thermostat 35, a second electrical juncture 36, the heating element 22, a third electrical juncture 37 and a fourth electrical juncture 38. A second series circuit of a fifth electrical juncture 39 and the timer assembly 28 are joined between switch assembly 26 and the first electrical juncture 34. A third series circuit of a light unit 27 and a variable heat responsive switch 40 are joined between the fourth 38 and fifth 39 electrical juncture, wherein resistor 60 is joined also between the second 36 and third 37 electrical junctures.

Hence, obvious changes may be made in the specific embodiment of the invention described herein, such modifications being within the spirit and scope of the invention claimed, it is indicated that all matter contained herein is intended as an illustrative and not as limiting in scope.

Having thus described the invention, what we claim as new and desire to secure by Letters Patent of the United States is:

1. A liquid heating device, which comprises:
   a. a cylindrically shaped container having a closed base, an upwardly extending cylindrically shaped sidewall, an interior chamber therein, wherein a pouring spout and a U-shaped handle communicate with said sidewall;
   b. a removable top lid cover communicating with an open top end of said container; said container and said lid cover being of thermally and electrically insulating material;
   c. a control panel contained on a bottom outside periphery of said sidewall;
   d. an inlet receptacle, a two way switch assembly, a light unit and a timer assembly contained in said control panel; and
   e. an interior electrical heating element within said interior chamber electrically communicating in an electric circuit, said electric circuit including a first series circuit of a power source, said two way switch, a first electrical juncture, a thermostatic unit in fluid contact with a liquid adapted to be received in said interior chamber, a second electrical juncture, said heating element, a third electrical juncture, and a fourth electrical juncture, a second series circuit of a fifth electrical juncture and said timer assembly joined between said switch assembly and said first electrical juncture, and a third series circuit of said light unit and a variable heat responsive switch, said heat responsive switch joined to said third and said fourth electricl junctures, said electric circuit being electricaly insulated.

2. A liquid heating device as recited in claim 1, wherein said device further comprises a transparent tube member having a continuous bore therethrough passing through the legs of said U shaped handle, wherein the ends of said tube communicate with said interior chamber of said container.

* * * * *